United States Patent [19]

Short

[11] 3,892,855

[45] July 1, 1975

[54] METHOD FOR FERTILE BREEDING CONTROL IN FEMALE BOVINE

[75] Inventor: George E. Short, Arlington Heights, Ill.

[73] Assignee: G. D. Searle & Co., Chicago, Ill.

[22] Filed: Oct. 10, 1973

[21] Appl. No.: 405,045

[52] U.S. Cl. .............................................. 424/238
[51] Int. Cl.$^2$......................................... A61K 17/00
[58] Field of Search ................................... 424/238

[56] References Cited
UNITED STATES PATENTS

| | | | |
|---|---|---|---|
| 3,409,721 | 11/1968 | Applezweig | 424/238 |
| 3,795,734 | 3/1974 | Rochefort | 424/238 |

*Primary Examiner*—Elbert L. Roberts
*Attorney, Agent, or Firm*—Elliot N. Schubert; John J. McDonnell

[57] ABSTRACT

This invention concerns a method for fertile breeding control in female bovine by sequentially administering a progestin followed by a luteolytic agent. The progestin blocks estrus and ovulation and is administered in a manner to retain sufficiently high blood levels for that purpose for about 4 to 12 days. A luteolytic substance is then administered. 17$\alpha$-Acetoxy-11$\beta$-methyl-19-norpregn-4-ene-3,20-dione is incorporated in a polymer consisting of a major amount of 2-hydroxyethyl methacrylate and a minor amount of ethylene glycol methacrylate to form an implant which is implanted to establish an estrus and ovulation blocking period. The progestin regimen is followed by a single dose of PGF$_{2\alpha}$ as a luteolytic agent. The onset of estrus occurs 1 to 5 days after the administration of the luteolytic agent and the animals are bred by artificial or natural insemination.

4 Claims, No Drawings

METHOD FOR FERTILE BREEDING CONTROL IN FEMALE BOVINE

This invention is concerned with a method of fertile breeding control in female bovine.

It is an object of this invention to rapidly bring an entire herd of randomly cycling female bovine into estrus and ovulation at the same time without a reduction in fertility in order to produce offspring in a more economical manner.

The presnt invention involves the administration of a progestin in amounts to be effective as a substitute corpus luteum for 4–12 days, thereby establishing an estrus and ovulation blocking period of about 4 to 12 days. The estrus and ovulation blocking period is followed by administration of an effective amount of a luteolytic agent. Estrus followed by ovulation occurs in 1–5 days after termination of the above regimen and when estrus occurs the cattle are bred artificially by procedures commonly employed by those skilled in the art. Breeding may also be by the clock without estrus detection.

17$\alpha$-Acetoxy-11$\beta$-methyl-19-norpregn-4-ene-3,20-dione, chlormadinone acetate, dimethisterone, ethisterone, hydroxyprogesterone, hydroxyprogesterone caproate, medroxyprogesterone, norethynodrel, progesterone, 3-ethylenedioxy-17-acetoxy-6-methylpregn-5-en-20-one and 16,17-dihydroxy progesterone acetophenide are suitable but not exclusive progestins. The progestin is administered in order to form a substitute corpus luteum in all animals, including those refractory to a luteolytic agent. Thus, any progestational agent administered in a manner to maintain blood levels of the progestin for a sufficient time to accomplish the above stated purpose is within the scope of this invention.

Parenteral administration by intramuscular, subcutaneous or intravenous injections, by implants or peroral are suitable methods for obtaining the desired progestin blood level for the required period of time. The implant is a preferred method of administration since it involves minimum contact with the animals to effect optimum temporal control and is therefore more effective and economical. The implant may be a biologically acceptable polymer such as siliconized rubber, collagen, or a copolymer containing a major amount of 2-hydroxyethylmethacrylate and a minor amount of the diester of ethylene glycol dimethacrylate into which the progestin has been incorporated. Polymers described in U.S. Pat. No. 3,220,960 and implants described in U.S. Pat. Nos. 3,551,556 and 3,577,512 of appropriate size and dosage are useful for practicing this invention.

The luteolytic agent is administered at or near termination of the progestin treatment. A luteolytic amount of an estrogen such as estradiol valerate, estradiol benzoate, estrone, or mestranol is suitable. For example 5 mg. of estradiol valerate is a luteolytic amount. A luteolytic amount of a prostaglandin such as $PGF_2\alpha$ is a preferred luteolytic agent. Parenteral administration, for example a single intramuscular injection, vaginal supositories, or infusion of solutions into the uterus or uterine horn, are suitable but not exclusive methods of administration. The preferred regimen of luteolytic agent is a single intramuscular injection of an effective luteolytic amount of $PGF_2\alpha$.

A preferred embodiment of the present invention is the surgical insertion, subcutaneously in the ear, of a 120 mg., 3 mm. × 18 mm. cylindrical implant containing 5 percent 17$\alpha$-acetoxy-11$\beta$-methyl-19-norpregn-4-ene-3,20-dione homogeneously dispersed in a copolymer containing 10 parts of 2-hydroxyethyl methacrylate and 1 part of ethylene glycol dimethacrylate on day 1. The implant is removed on day 8 and 30 mg. of $PGF_2\alpha$ in a phosphate buffer solution of pH of about 7.6 is administered by intramuscular injection. Fifty randomly cycling cows were treated in the above manner and observed for evidence of estrus. Table I illustrates the number of cows in estrus after a given time period.

Table I

| Hours | Cows in Estrus/Total |
| --- | --- |
| 36 | 8/50 |
| 60 | 32/50 |
| 84 | 41/50 |
| 108 | 46/50 |
| 120 | 48/50 |

The cows are bred by artificial insemination approximately 12 hours after the onset of estrus. The conception rate to first service is 60 percent.

This method is particularly advantageous in that essentially all of the cows are brought into estrus followed by ovulation regardless of the stage of their cycle at implantation. The animals can be bred in a short time span with a minimum of observation and handling. The advantages of the present fertile breeding control regimen are illustrated by the estrus responses of a statistically distributed hypothetical herd of 100 randomly cycling cows as set out in Table II.

Table II

| Day | No. in Estrus | |
| --- | --- | --- |
|  | (a) | (b) |
| 1 | 5 | 0 |
| 2 | 5 | 0 |
| 3 | 5 | 0 |
| 4 | 5 | 0 |
| 5 | 5 | 0 |
| 6 | 5 | 0 |
| 7 | 5 | 0 |
| 8 | 5 | 0 |
| 9 | 5 | 20 |
| 10 | 5 | 20 |
| 11 | 5 | 20 |
| 12 | 5 | 20 |
| 13 | 5 | 20 |
| 14 | 5 | 0 |
| 15 | 5 | 0 |
| 16 | 5 | 0 |
| 17 | 5 | 0 |
| 18 | 5 | 0 |
| 19 | 5 | 0 |
| 20 | 5 | 0 |
| 21 | 5 | 0 |

Column (a) in Table II illustrates the expectation of estrus onset in a herd of 100 randomly cycling cows without cycle control and column (b) illustrates the onset of estrus in the same herd when treated by the method of the present invention. It is apparent from Table II that in the absence of cycle control daily observation for artificial insemination is required. The present method of cycle control reduces the number of observation and fertilization days from 20–21 to about 5.

The fertility rate—the number of cows which have conceived at the end of the first cycle—is essentially the same for treated and untreated cows. This method provides for a considerable increase in productivity ice a larger number of cows have conceived at an rlier date and will, therefore, calve at an earlier average date.

Faulkner et al., Journal of Animal Science, 33, 604 971) used a regimen of 250 mg. of norethandrolone the wall of an implant, 5 mg. of estradiol valerate on e day of implantation, and 2 mg. of estradiol-17β on-luteolytic amount) 24 hours after implant removal to induce estrus in the entire herd in the time ame hypothetically set out in Table II. The fertility te to first service in the treated was 34 percent as mpared to a fertility rate of 55 percent for untreated ntrols. This reduction of fertility defeats any advanges of estrus synchronization. Evidently estrus but t ovulation was synchronized. Faulkner further deribes a regimen of a norethandrolone implant for 9 ys together with estradiol valerate on the day of imantation. This regimen does not synchronize estrus in e entire herd and thereby results in economic loss. pparently animals in the refractory portion of their cle are unresponsive to this treatment.

The fertile breeding method of the present invention volves a progestin implant to serve as a substitute cors luteum in those animals in which the natural corpus teum may spontaneously regress until such time as ose in the refractory first 4–5 days of the cycle have ached the stage at which their corpora lutea are sus:ptible to a luteolytic agent, followed by a substance fective in causing luteal regression. This provides for trus and ovulation synchronization of the entire herd ith normal fertility.

Estrus and ovulation blocking progestination can be nployed over an extended period of time—20–30 ys—to be followed by a luteolytic agent to induce esus in the entire herd but would not provide the fertil/ and other advantages of a shorter time period of, for :ample, 4–12, preferably 7, days. This embodiment of e present invention provides for a minimum observa>n time but the period for breeding could be extended a perhaps more desirable, future fertilization date. A inimum progestination period of about 4 days is reıired to control the time of estrus and ovulation in the itire herd. If the progestination period is shortened to ss than about 4 days, the control of the time of estrus ıd ovulation is less precise.

The following example is set forth to illustrate the ·esent invention and should not be construed as limitg the scope of the invention.

EXAMPLE 1

Fifty randomly cycling cows received an implant in e ear by surgical insertion on treatment day 1. The ıplant was a 3 mm. × 18 mm. cylinder weighing 120 g. and contained 5 percent 17α-acetoxy-11β-methyl)-norpregn-4-ene-3,20-dione homogeneously dis:rsed in a copolymer of a 10/1 ratio of 2-hydroxyethyl ethacrylate to ethylene glycol dimethacrylate. The implant was removed on treatment day 8 and the animals received an intramuscular injection of 30 mg. of $PGF_2 \alpha$ in a phosphate buffer of pH 7.6 at that time. Estrus was detected by visual observation and the animals were bred 12 hours after the detection of estrus by standard techniques of artificial insemination. Thirty of the 50 cows were diagnosed to be pregnant.

What is claimed is:

1. A method for fertile breeding control in female bovine comprising:
   a. establishing an estrus and ovulation blocking period of 4 to 12 days by administering subcutaneously for 4–12 days to a female bovine an implant of biologically acceptable polymer containing at least 6 mg. of a progestin selected from the group comprising 17α-acetoxy-11β-methyl-19-norpregn-4-ene-3,20-dione, chlormadinone acetate, dimethisterone, ethisterone, hydroxyprogesterone, hydroxyprogesterone caproate, medroxyprogesterone, norethynodrel, progesterone, 3-ethylenedioxy-17-acetoxy-6-methylpregn-5-en-20-one and 16,17-dihydroxy progesterone acetophenide and
   b. administering upon removal of the implant by injection a luteolytic agent selected from the group consisting of at least 5 mg. of estrogens selected from the group comprising estradiol volerate, estradiol benzoate, estrone and mestranol and at least 30 mg. of $PGF_2 \alpha$.

2. As in claim 1, a method for fertile breeding control in female bovine comprising:
   a. administering subcutaneously for 4–12 days to a female bovine an implant of biologically acceptable polymer containing 6–12 mg. of 17α-acetoxy-11β-methyl-19-norpregn-4-ene-3,20-dione and
   b. administering by injection at least 30 mg. of $PGF_2 \alpha$ upon removal of said implant.

3. As in claim 1, a method for fertile breeding control in female bovine comprising:
   a. administering subcutaneously for 4–12 days to a female bovine an implant containing at least 6 mg. of 17α-acetoxy-11β-methyl-19-norpregn-4-ene-3,20-dione incorporated in biologically acceptable polymer and
   b. administering by injection 30 mg. of $PGF_2 \alpha$ upon removal of said implant.

4. As in claim 1, a method for fertile control in female bovine comprising:
   a. administering subcutaneously for 7 days to a female bovine an implant containing 6 mg. of 17α-acetoxy-11β-methyl-19-norpregn-4-ene-3,20-dione incorporated in 120 mg. of a copolymer made of 10/1 mixture of 2-hydroxyethyl methacrylate and ethyleneglycol dimethylmethacrylate and
   b. administering by injection 30 mg. of $PGF_2 \alpha$ in phosphate buffer upon removal of said implant.

* * * * *